May 13, 1930.  A. P. STRONG  1,758,182
PULLEY
Filed Jan. 2, 1924
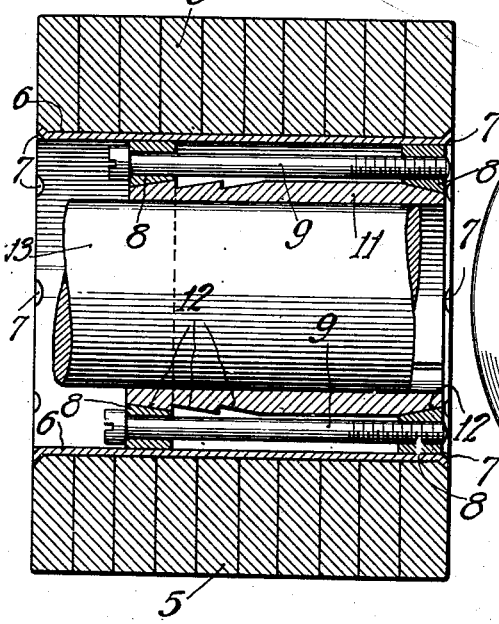
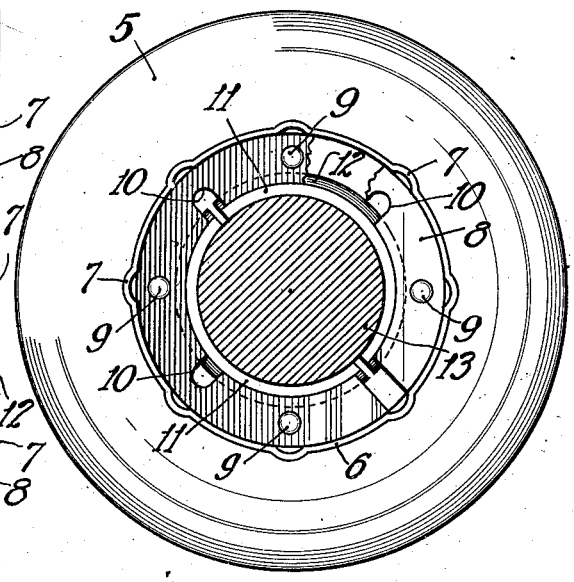
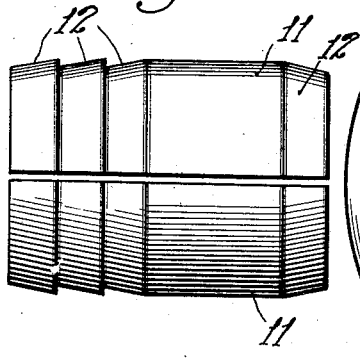
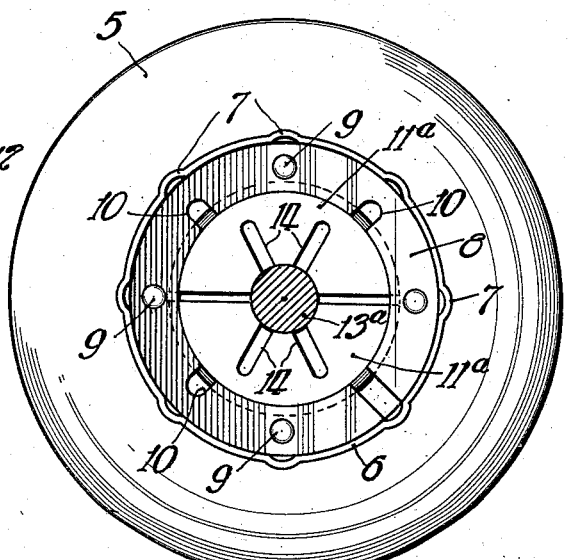
Inventor.
Arthur P. Strong.

Patented May 13, 1930

1,758,182

UNITED STATES PATENT OFFICE

ARTHUR P. STRONG, OF MISHAWAKA, INDIANA, ASSIGNOR TO DODGE MANUFACTURING CORPORATION, OF MISHAWAKA, INDIANA, A CORPORATION OF DELAWARE

PULLEY

Application filed January 2, 1924. Serial No. 683,848.

This invention aims to provide a standardized pulley having means for readily securing it to shafts of different diameters and lengths.

The invention may be understood by reference to one illustrative embodiment shown in the accompanying drawings in which:

Figure 1 is a diametric section of the pulley;

Fig. 2 is an end elevation of the same;

Fig. 3 is a side elevation of the hub;

Fig. 4 is an end elevation showing the pulley mounted upon a smaller shaft.

The illustrative pulley, designed for electric motor shafts, has its main parts of standard uniform sizes for application to any shaft within a wide range of different diameters and lengths, while only a single part (and that of simple and inexpensive construction) need be changed to suit the pulley to any shaft within that range.

The main parts, which are standard for a variety of shaft sizes, comprise the pulley shell and the devices for securing it to a removable hub. The hubs are of standard exterior form and dimensions and can be interchangeably assembled with the pulley shell and securing devices; but different hubs have different bores to accommodate shafts of different diameters.

It is to be understood that the illustrative form shown in the drawings is simply a preferred embodiment of the invention; and that in the following explanation of that specific form, the described details of structure and organization are merely exemplary.

The pulley shell 5, of laminated wood, is interiorly fitted with a steel sleeve 6, which is rigidly secured to the shell by being pinched or upset at intervals, as indicated at 7. Such a shell may be manufactured in a single size for application to shafts of various diameters.

Within the steel sleeve are two spaced split clamping rings 8 connected by several machine bolts or screws 9 passing through one of the rings and threaded into the other. These rings 8 have cylindrical outer surfaces and frusto-conical inner surfaces; and, to facilitate their expansion and contraction, each has a number of radial notches or fractional splits 10. In practice, the rings are of uniform standard size, made of cast iron, and are of such diameter that they initially fit more or less snugly within the pulley shell.

Within the split rings is a hub 11, of cast iron, split longitudinally, and formed exteriorly with frusto-conical seats 12 complementary to the frusto-conical inner surfaces of the split rings. Said frusto-conical seats 12 at opposite ends of the hub, are oppositely inclined, so that when the bolts or screws 9 are turned to draw the split rings 8, 8 toward each other, the rings will be wedged between the outer shell 5 and the hub 11 causing a simultaneous contraction of the hub to grip the shaft, and expansion of the rings to grip the pulley shell. This serves to secure the pulley parts firmly together and to fix the pulley as a whole upon the shaft.

The hub 11 has at one end (Fig. 3) a number of adjacent frusto-conical seats 12 any of which will mate with one of the clamping rings. In Fig. 1, the left-hand clamping ring is shown applied to the outermost frusto-conical seat 12, but it could be applied to the second or any other such surface; and the end of the hub may be cut off, as indicated by the dotted line in Fig. 1, to shorten it for use with a shorter shaft without requiring any change in the standard pulley shell or clamping rings.

Figs. 1 and 2 show the pulley applied to a shaft 13 of relatively large size; but as shown in Fig. 4 it is readily made fast to a smaller shaft 13ª by replacing hub 11 with a similar hub 11ª having an external diameter equal to that of hub 11 but having an internal bore of appropriate size for shaft 13ª. The correspondingly thicker hub 11ª is formed with fractional splits 14 to render it readily contractible to grip the shaft.

The described construction permits the pulley shell to be mounted upon short as well as long shafts and on shafts of widely different diameters. The shell and rings are standard and interchangeable and therefore lend themselves to quantity production; and only the hubs need be changed to fit the shell to different sizes of shafts. Also, the pulley shell, the clamping rings, the hub, and the shaft are all mutually adjustable to desired relations, by relatively moving them either axially of the shaft or circumferentially; and when adjusted they may be clamped securely and permanently together.

Obviously the invention is not limited to the embodiment herein shown and described.

What is claimed is:—

1. A pulley comprising, in combination, a shell; a bushing having a number of securing surfaces arranged to be used alternatively, permitting one or more thereof to be removed to shorten the bushing to suit a selected shaft length; and means intermediate the shell and bushing, constructed and arranged to cooperate with any said securing surface, to secure the shell and bushing together.

2. A pulley comprising, in combination, a pulley shell; a pair of expansible rings within the shell; a contractible bushing within said rings and having a series of alternatively-usable securing surfaces; one ring being engageable with any one of said securing surfaces; and means for causing said rings to secure the shell and bushing together.

3. A pulley comprising, in combination, a pulley shell made up of a plurality of wooden laminations and an internal metallic sleeve permanently locked to and within the shell, the whole comprising a standardized unit designed for use with shafts of different diameters; and a shaft securing means for the shell expansible within the shell and simultaneously contractible upon the shaft to lock the shell to the shaft.

4. As an article of manufacture, the combination of a pulley shell made up of a plurality of wooden laminations and an internal metallic sleeve locked to and within the laminations and having a cylindrical interior; means within the shell to apply pressure radially, simultaneously toward and from the axis of the pulley; and a separate contractible bushing arranged to be contracted by said means to grip a shaft; the whole being constructed and arranged to secure the shell to the bushing and the bushing to a shaft by a frictional grip alone, and to permit ready replacement of the bushing by another bushing of the same exterior dimensions but of different interior bore; whereby the shell, the bushing, said pressure means, and the shaft, are all mutually adjustable to desired relations by relatively moving them either axially of the shaft or circumferentially, and the shell is susceptible of ready use with bushings of different bores to suit shafts of different diameters.

In testimony whereof, I have signed my name to this specification.

ARTHUR P. STRONG.